(12) United States Patent
Strubhar et al.

(10) Patent No.: US 6,728,625 B2
(45) Date of Patent: Apr. 27, 2004

(54) HUMIDITY COMPENSATED CHARGE DENSITY CONTROL FOR AN INTERNAL COMBUSTION ENGINE

(75) Inventors: Sean R. Strubhar, East Peoria, IL (US); William C. Boley, Lafayette, IN (US)

(73) Assignee: Caterpillar Inc, Peoria, IL (US)

( * ) Notice: Subject to any disclaimer, the term of this patent is extended or adjusted under 35 U.S.C. 154(b) by 15 days.

(21) Appl. No.: 10/256,627

(22) Filed: Sep. 27, 2002

(65) Prior Publication Data

US 2004/0064242 A1 Apr. 1, 2004

(51) Int. Cl.[7] .............................................. F02M 25/07
(52) U.S. Cl. ..................... 701/104; 701/102; 123/480; 123/676
(58) Field of Search ................................ 701/104, 102, 701/101; 123/676, 480, 678

(56) References Cited

U.S. PATENT DOCUMENTS

| 4,364,364 A | * | 12/1982 | Subramaniam | ............. | 123/676 |
|---|---|---|---|---|---|
| 4,867,127 A | | 9/1989 | Quirchmayr et al. | | |
| 5,735,245 A | | 4/1998 | Kubesh et al. | | |
| 6,062,204 A | * | 5/2000 | Cullen | ................... | 123/568.22 |
| 2003/0136390 A1 | * | 7/2003 | Ramamurthy et al. | . | 123/568.22 |

FOREIGN PATENT DOCUMENTS

| JP | 2003-239811 | * | 8/2003 | .......... F02M/25/07 |
|---|---|---|---|---|

OTHER PUBLICATIONS

U.S. application # 09/933,544 filed Aug. 20, 2001.
U.S. application 10/209,630 filed: Jul. 31, 2002.

* cited by examiner

Primary Examiner—Hieu T. Vo
(74) Attorney, Agent, or Firm—Clifton G Green

(57) ABSTRACT

Apparatus and methods for determining a desired charge density for an engine having an inlet air pathway. A first characteristic indicative of an engine speed of the engine is determined. A second characteristic indicative of a load on the engine is determined. A third characteristic indicative of a humidity of air in the inlet air pathway. A value indicative of a desired charge density of a combustion mixture for the engine is determined as a function of the first, second, and third characteristics.

35 Claims, 3 Drawing Sheets

HUMIDITY COMPENSATED CHARGE DENSITY CONTROL FOR AN INTERNAL COMBUSTION ENGINE

TECHNICAL FIELD

This invention relates generally to combustion control of an internal combustion engine, and more specifically, to control of a humidity compensated charge density of a combustion mixture for the engine.

BACKGROUND

Combustion control of engines has long been used to achieve various purposes. The three most notable purposes are to maximize power output, to maximize fuel economy, and to minimize emissions. In particular, emissions control has become a major factor in the development of engine controls.

Various conventional techniques exist for controlling the emissions of an engine. Most techniques deal in some form of controlling the amount of fuel, the amount of air or other combustible gas, and the timing of the ignition. These techniques vary significantly in the precision with which they are able to control emissions to a desired level. U.S. Pat. No. 4,867,127 to Quirchmayr, et. al. discloses regulating the combustion mixture pressure to achieve a desired $NO_x$ level. While this method may present some advantages over past strategies, further improvements are still sought by the industry.

SUMMARY OF THE INVENTION

The present invention provides apparatuses and methods for determining a desired charge density for an engine having an inlet air pathway. A first characteristic indicative of an engine speed of the engine is determined. A second characteristic indicative of a load on the engine is determined. A third characteristic indicative of a humidity of air in the inlet air pathway. A value indicative of a desired charge density of a combustion mixture for the engine is determined as a function of the first, second, and third characteristics.

DETAILED DESCRIPTION

Figure 1:
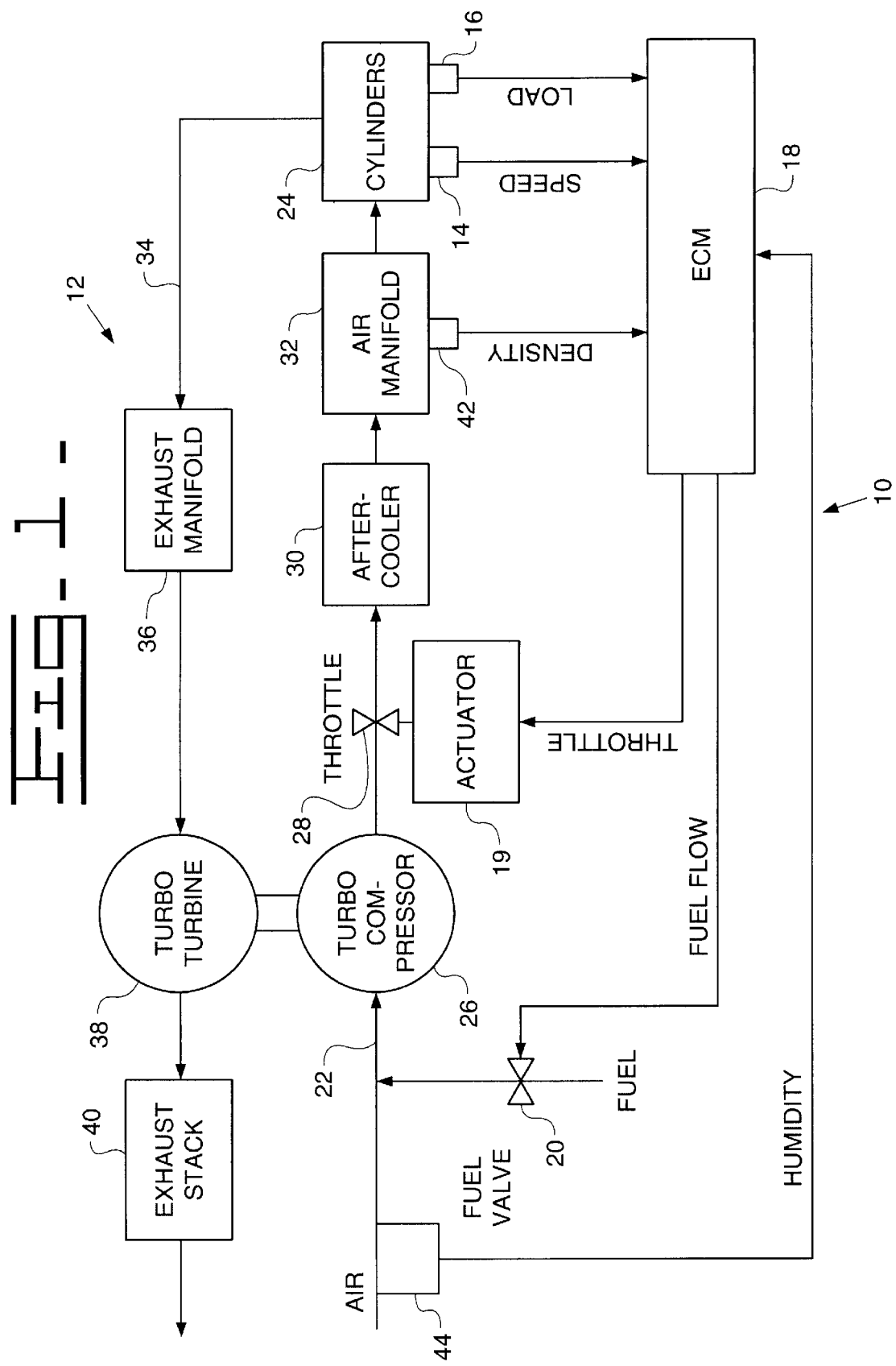
FIG. 1 is a block diagram of a fuel system and engine according to one embodiment of the invention.

FIG. 1 is a block diagram of a fuel system 10 and engine 12 according to one embodiment of the invention. Although the fuel system 10 and engine 12 are described here in the context of a natural gas engine, different types of fuel systems and engines may also be used in other embodiments of the invention, as appropriate.

The fuel system 10 typically includes a first sensor, such as an engine speed sensor 14 that is coupled with the engine 12. The engine speed sensor 14 may be operable to determine, e.g., receive, calculate, look-up, or otherwise come up with, a first characteristic or value indicative of an engine speed of the engine 12.

The phrase "indicative of" may include, but not necessarily be limited to, the characteristic or value of interest directly, e.g., the actual engine speed, as well as other characteristics/values that have a known relationship with the characteristic/value of interest, and thereby allow the characteristic/value of interest to be deduced from that other characteristic/value or characteristics/values. The term "value" may include, but not necessarily be limited to, a quantity, a coding scheme, and/or a signal. For ease of reading, these phrases may be omitted below, however, wherever a signal or characteristic is discussed, the signal may, where appropriate, implicitly include other values or characteristics "indicative of" the signal or characteristic being discussed.

The engine speed sensor 14 transmits an engine speed signal ("SPEED") as a function thereof. The engine speed sensor 14 can be any type of sensor that produces a signal indicative of engine speed. For example, in one embodiment, the engine speed sensor 14 may be mounted on an engine flywheel housing (not shown) and produces a signal in response to the speed of the flywheel that is coupled, e.g., physically attached or otherwise interacting with, with either directly or indirectly, with an engine crankshaft (not shown). Other sensors, such as in-cylinder type devices, may also be used. Further, the engine speed sensor 14 may determine the engine speed indirectly. For example, inlet and exhaust valve movement, cam position, cylinder pressure, and cylinder temperature may be used as indicators of engine speed, as could a variety of other indicators known to those skilled in the art.

The fuel system 10 typically includes a second sensor, such as a load sensor 16, that may be coupled with the engine 12. The load sensor 16 may be operable to determine a second characteristic indicative of a load on the engine, e.g., total load on the engine, and to transmit an engine load signal ("LOAD") as a function thereof. The load sensor 16 may be any of a variety of sensors known to those skilled in the art, such has a torque sensor or dynamometer, or other appropriate type of sensor. Although depicted in FIG. 1 as a single box, the load sensor 16 may be physically several sensors appropriately coupled with various devices that accept power from the engine 12, thereby loading the engine 12.

In one embodiment of the invention, a power receiving device, such as a generator (not shown), maybe coupled with the engine 12 to receive power from the engine 12. The load sensor 16 maybe coupled with the power receiving device, for example the generator, instead of being more directly coupled with the engine 12.

Further, the load sensor 16 maybe made up of more than one component. For example, in the embodiment where a generator is coupled with the engine 12, the load sensor 16 may include both a current sensor and a voltage sensor, both coupled with the generator. In this instance, the engine load signal LOAD may be the power produced by the generator, i.e., the product of the current and voltage produced by the generator. Here, the engine load signal LOAD would have more than one distinct component: a current signal and a voltage signal. Thus, a variety of appropriate sensors maybe coupled with the power receiving device to produce a signal indicative of the load on the engine 12.

In some embodiments of the invention, a charge density sensing device 42 may be coupled with an inlet air pathway 22. The inlet air pathway 22 may be thought of as the pathway for channeling air or other gas from a source, such as the ambient air, to a combustion chamber of the engine 12. The charge density sensing device 42 may determine at least one characteristic indicative of a charge density of the combustion mixture in the inlet air pathway 22, and transmit a charge density signal ("DENSITY") as a function thereof. For convenience's sake, the charge density sensing device is described as determining the density of the "combustion mixture". However, this term is intended to include any pure gas or mixture in the inlet air pathway 22. Similarly, the term "gas" is intended to include both pure gases and mixtures. Although the charge density sensing device 42 is shown in a particular location in FIG. 1, it may be located elsewhere in other embodiments of the invention. For example, in some embodiments of the invention, such as those using a massflow sensor as the charge density sensing device 42, it could be located before the compressor 26.

The charge density sensing 42 device may be any of a variety of appropriate devices known to those skilled in the art. In some embodiments of the invention, the charge density sensing device 42 may be a massflow sensor, while in other embodiments it may be the combination of a pressure sensor and a temperature sensor. In the latter case, the density of the combustion mixture may be determined by dividing the pressure of the mixture by its temperature. From the ideal gas law:

$PV = nRT$ where

P=pressure of the gas mixture

V=volume of the gas mixture n=ideal gas constant

R=mass of the gas mixture in moles

T=temperature of the gas mixture.

Thus, density, which is a measure of mass divided by volume, e.g., R/V, is equal to P/nT, where n is a constant. Thus, density is a function of P/T.

In embodiments where density is determined as a function of pressure divided by temperature, the charge density signal DENSITY may be both a pressure signal and a temperature signal. By this it is meant that the charge density signal DENSITY need not be a singular signal, but may be more than one distinct signal, or a single signal having more than one piece of datum associated with it. For simplicity's sake, however, the charge density signal DENSITY in FIG. 1 is represented by a single line.

The fuel system 10 may also include a humidity sensor 44 coupled with the inlet air pathway 22. The humidity sensor determines a humidity, e.g., the absolute humidity, of the air in the inlet air pathway 22, and transmits a humidity signal ("HUMIDITY") as a function thereof.

The humidity sensor 44 may be placed anywhere in the inlet air pathway 22, and is not limited to the location shown in FIG. 1. For durability reasons, however, it may be desirable to place the humidity sensor 44 on the upstream side of the compressor 26.

In some embodiments of the invention, the humidity sensor 44 may include two components: a relative humidity sensor and a temperature sensor. In these embodiments, the humidity sensor 44 may determine the absolute humidity as a function of the relative humidity and the temperature, and transmit an absolute humidity signal HUMIDITY as a function thereof. Alternately, the humidity sensor 44 may transmit data indicative of both characteristics (relative humidity, temperature) as the humidity signal HUMIDITY. In this latter case, in effect, the humidity signal HUMIDITY would be two signals: a relative humidity signal and a temperature signal.

The fuel system 10 may also include a processing device, such as a microprocessor or an electronic control module ("ECM") 18. The electronic control module 18 maybe coupled with the engine speed sensor 14, the load sensor 16, the charge density sensing device 42, and the humidity sensor 44 to receive the engine speed signal SPEED, the engine load signal LOAD, the charge density signal DENSITY, and the humidity signal HUMIDITY. The electronic control module 18 transmits a desired fuel flow signal ("FUEL") as a function of the engine speed signal SPEED and engine load signal LOAD, the humidity signal HUMIDITY, and possibly the charge density signal DENSITY, as will be described below.

The desired fuel flow signal may be any of a variety of signals indicative of fuel flow. For example, it may be a fuel flow quantity, a fuel flow duration, a position of a fuel valve, a change in position of a fuel valve, or a rate of change of a position of a fuel valve. Similarly, it may be an air flow quantity, an air flow duration, a position of an air valve (including a bypass or wastegate), a change in position of an air valve, or a rate of change of a position of an air valve.

In appropriate embodiments of the invention, the ECM may also transmit a throttle signal ("THROTTLE") that is operable to control a throttle valve actuator 19, and thereby control a throttle valve 28, by ways known to those skilled in the art. The ECM 18 will be described further below.

The fuel system 10 may further include a fuel valve 20 coupled with electronic control module 18 to receive the desired fuel flow signal. The fuel valve 20 may be coupled with a fuel supply, and the fuel valve 20 delivers a quantity of fuel, e.g., natural gas, propane, or other combustible material known to those skilled in the art, into the inlet air pathway 22 by ways known to those skilled in the art.

In one embodiment of the invention, the fuel valve 20 may be a Raptor™ valve from Caterpillar Inc. In another embodiment, the valve 20 may be a Tecjet™. Other valves known to those skilled in the art may also be used as appropriate.

In other embodiments of the invention, instead of controlling a fuel valve 20, the fuel system 10 may control an air valve (not shown), thereby controlling the amount of combustion mixture that is in the inlet air pathway 22 by ways known to those skilled in the art.

The engine 12 typically includes at least a portion of the inlet air pathway 22 (the pathway that couples a source of air or other gas with a combustion chamber, such as at least one cylinder 24 of the engine 12). A mixer (not shown), compressor 26, throttle valve 28, cooler 30, and inlet air manifold 32 may be coupled with or integrated into the air inlet passageway 22. These devices function by ways known to those skilled in the art, and will not be described here in interest of brevity. In embodiments of the invention, one or more of these devices may be omitted as appropriate. In particular, using some fuel control valves, e.g., the Raptor™ fuel valve, may obviate the need for the mixer.

The engine 12 also typically includes an exhaust pathway 34 for venting the cylinder(s) 24 by ways known to those skilled in the art. An exhaust manifold 36, turbine 38, and exhaust stack 40 maybe coupled with or integrated into the exhaust pathway 34. These devices function by ways known to those skilled in the art, and will not be described here in interest of brevity. In embodiments of the invention, one or more of these devices may be omitted as appropriate.

Figure 2:
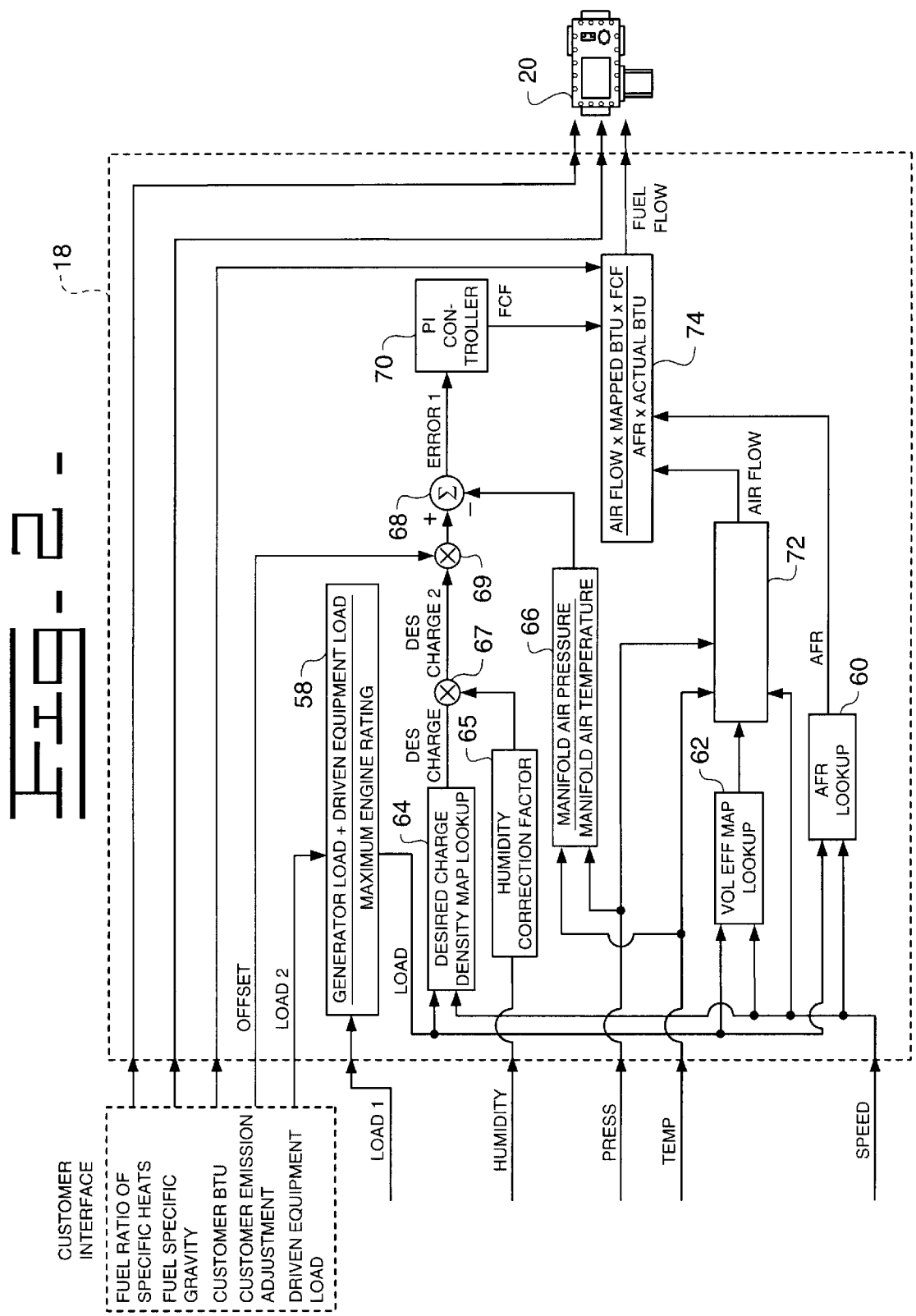
FIG. 2 is a functional block diagram of the electronic control module according to one embodiment of the invention.

FIG. 2 is a functional block diagram of the electronic control module 18 according to one embodiment of the invention. As previously discussed, the ECM 18 may be coupled with the speed sensor 14, load sensor 16, the charge density sensing device 42, and the humidity sensor 44 to receive their respective signals.

In block 58, the ECM 18 may determine a total load on the engine 12 and transmit the load signal LOAD as a function thereof. Typically, the load signal LOAD is a function of a primary load, such as a generator (not shown) that typically draws a majority of the power output from the engine 12, and often includes one or more secondary loads, such as a fan (not shown) or pump (not shown) that draws some other, typically lesser amount of power from the engine 12. Values indicative of the primary and secondary loads are respectively transmitted as the primary load signal ("LOAD1") and the secondary load signal ("LOAD2") by ways known to those skilled in the art.

In embodiments of the invention, the load signal LOAD may be a normalized signal, such as by summing the values of the primary and secondary loads and dividing that value by the maximum load capability of the engine 12. Alternately, the load signal LOAD may just be the sum of the primary and secondary load values.

In block 60, the ECM 18 may use the engine speed signal SPEED and the load signal LOAD to determine an air to fuel ratio signal ("AFR") by ways known to those skilled in the art. For example, the ECM may consult a map of air to fuel ratios for the particular value of the engine speed signal SPEED and the load signal LOAD, or use the values of these two signals in an equation to calculate the desired air to fuel ratio signal AFR. Both the map and equation may be dependent on the particular engine for which the ECM is designed, and the particular mathematical relationship between the engine speed signal SPEED, the load signal LOAD, and the air to fuel ratio signal AFR are determined experimentally by ways known to those skilled in the art. Typically the air to fuel ratio signal AFR is a measure of the most recent air to fuel ratio of the engine 12, although it could also be a desired air to fuel ratio, including predictive logic based on the engine's 12 recent performance history, e.g., speed and load.

In block 62, the ECM 18 may use the engine speed signal SPEED and the load signal LOAD to determine a volumetric efficiency ("VOL EFF") for the engine 12 by ways known to those skilled in the art.

In block 64, the ECM 18 may use the engine speed signal SPEED and the load signal LOAD to determine a desired charge density ("DES CHARGE") for the combustion mixture by ways known to those skilled in the art. For example, mathematical relationship between the desired charge density DES CHARGE and the engine speed signal SPEED and the load signal LOAD may be determined by running the engine 12 at a given speed and load and mapping a performance characteristic of the engine 12, such as $NO_x$ emissions, for various charge densities. This may then be repeated for different engine speeds and loads. Other performance characteristics of the engine 12 could also be mapped.

In block 65, the ECM 18 uses the humidity signal HUMIDITY to adjust the desired charge density signal DES CHARGE. Typically the desired charge density DES CHARGE is selected to control a particular characteristic, such as emissions of $NO_x$, for example, of the engine 12. For a given desired charge density of an engine 12, all other things remaining the same, changes in the humidity of the air in the inlet air pathway 22 typically cause changes in the emissions of $NO_x$. The particular relationship between humidity and $NO_x$ or other emissions is typically dependent on the particular model of engine 12, and may be determined experimentally by fixing the charge density, measuring emissions, varying the humidity, and re-measuring the emissions. Typically, over limited and select operating ranges, $NO_x$ emissions have a linear relationship with humidity. As the size of the operating range increases, or if the engine 12 is operating in extreme temperature or humidity conditions, the relationship becomes more non-linear.

Once the relationship between the particular emission and the humidity is determined, a change in humidity may be compensated for by a change in the desired charge density. Again, the particular compensation scheme will typically depend on the particular model of engine 12 being used, and may be determined experimentally by varying the charge density and seeing what level of compensation it creates.

Based on this experimentation, or other techniques known to those skilled in the art, a humidity compensation map may be created. In block 67 the desired charge density signal DES CHARGE is modified, e.g., multiplied by a humidity compensation factor, to compensate for humidity, thereby creating a second, humidity compensated desired charge density signal ("DES CHARGE2").

In some embodiments of the invention, an operator of the engine 12 may set an offset ("OFFSET") for the charge density. This offset value OFFSET may be used to compensate for manufacturing tolerances of the engine or for particular environmental conditions of the engine, such as altitude, or it may be used for fine adjustment, such as re-tuning an engine to meet a new emissions level. Where an offset value OFFSET is used, in block 69 the offset value OFFSET is typically multiplied, but in appropriate situations may be instead added or subtracted from the second desired charge density signal DES CHARGE2, thereby scaling the desired charge density signal DES CHARGE2. In embodiments where the offset value OFFSET is added or subtracted, the addition or subtraction of the offset value OFFSET may occur in block 68, with block 69 omitted.

In embodiments of the invention where the charge density signal DENSITY includes the pressure signal PRESS and the temperature signal TEMP, in block 66 the ECM may use determine the actual charge density ("ACT CHARGE") of the combustion mixture. In embodiments of the invention where the charge density sensing device 42 has already performed this operation, or in embodiments where a mass-flow sensor or equivalent is used, block 66 may be omitted and the charge density signal DENSITY may be transmitted to block 68 as the actual charge density ACT CHARGE.

In block 68, the ECM determines the difference ("ERROR1") between the actual charge density ACT CHARGE and the (scaled) second desired charge density signal DES CHARGE2.

In some embodiments of the invention, in block 70, the difference ERROR1 between the actual charge density ACT CHARGE and the desired charge density DES CHARGE may be modified, such as by inputting it into an algorithm, such as a proportional, integral ("PI") controller to produce a second signal that is used as a fuel correction signal ("FCF"). Other types of controllers known to those skilled in the art could also be used, such as proportional controllers, integral controllers, derivative controllers, feed forward controllers, or some combination thereof. In other embodiments of the invention, block 70 may be omitted.

In block 72, the engine speed SPEED, the volumetric efficiency VOL EFF, a signal indicative of the pressure of the combustion mixture ("PRESS"), and a signal indicative of the temperature of the combustion mixture ("TEMP") are used to determine an actual air flow ("AIR FLOW") in the inlet air pathway 22 by ways known to those skilled in the art. The pressure and temperature signals may be taken from the charge density sensing device 42, or may be determined by other ways and in other locations. Even though the product of block 72 is labeled "AIR FLOW", it is not necessarily limited to the flow of air. Instead, block 72 may be used to determine a gas flow, be it air or some other pure gas or gas mixture.

In block 74, the fuel correction factor FCF, the air flow AIR FLOW, the air to fuel ratio AFR, and a fuel BTU ("ACTUAL BTU") indicative of a heating capacity of the fuel currently being supplied to the engine 12, are used to determine a desired fuel flow FUEL FLOW of the fuel valve 20 according to one embodiment of the invention. The particular algorithm used to determine the fuel flow FUEL FLOW may be determined by ways known to those skilled in the art. In one embodiment, the fuel flow FUEL FLOW is equal to:

(AIR FLOW*MAPPED *BTU*FCF*)/(*AFR*ACTUAL *BTU*), where MAPPED BTU is indicative of a heating capacity of the fuel that was supplied to the engine 12 during the calibration of the ECM 18 and engine 12. In other embodiments of the invention, different signals could be used, and/or omitted to determine the fuel flow FUEL FLOW.

The fuel flow FUEL FLOW may be transmitted to the fuel valve 20 to cause the fuel valve 20 to provide fuel to the engine 12 as a function of the fuel flow signal FUEL FLOW.

In some embodiments of the invention, the fuel valve 20 may receive additional signals for determining the amount of fuel that it is to provide to the engine 12. For example, the ratio of the specific heat of the fuel that is being used versus that which was used to calibrate the fuel system 10, and the specific gravity of the fuel that is provided to the engine 12 may be used to adjust the fuel flow signal FUEL FLOW. These adjustments typically may be used to calibrate the fuel flow signal FUEL FLOW where the type of fuel being provided to the engine 12 is different from the type of fuel that was used when the algorithm for determining the fuel flow signal FUEL FLOW was created.

In other embodiments of the invention, the ECM may use these signals to adjust the fuel flow signal FUEL FLOW instead of the fuel valve 20 making this compensation.

In some embodiments of the invention, some of the functional blocks shown in FIG. 2 may be omitted or modified. For example, FIG. 2 generally shows a closed loop control system. It would also be possible to run open loop. In this situation, for example, the feedback of the actual charge density, such as from the charge density sensing device 42 may be omitted. This may translate into omitting blocks 64, 66, 68, and 70 from FIG. 2, and making the appropriate adjustment to block 74.

Figure 3:
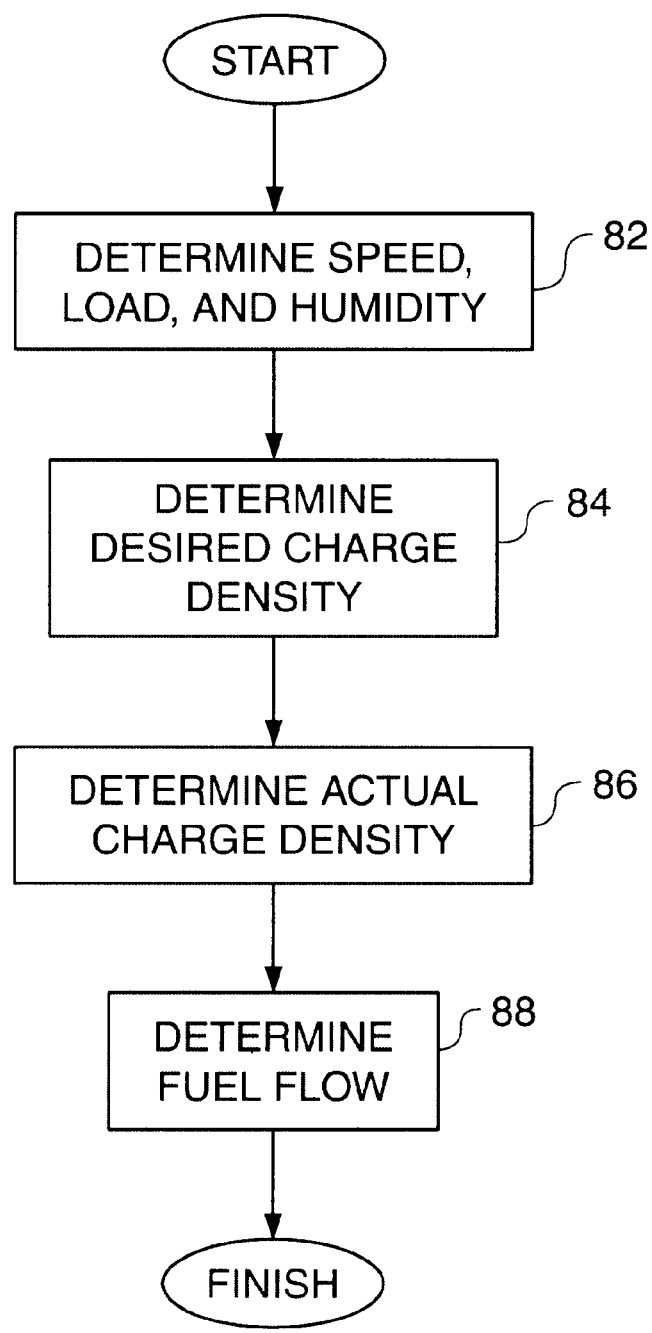
FIG. 3 is a flow chart according to one embodiment of the invention.

FIG. 3 is a flow chart 80 according to one embodiment of the invention. In block 82, characteristics indicative of the engine speed and load on the engine are determined, as well as the humidity of air in the inlet air pathway.

In block 84, the desired charge density for the combustion mixture are determined as a function of the engine speed, the load on the engine, and the humidity.

In block 86, the actual charge density of the combustion mixture is determined, using the techniques described above or any other technique known to those skilled in the art. In some embodiments of the invention, block 86 may be omitted. This would be tantamount to running open loop.

In block 88, a fuel flow for the engine 12 is determined as a function of the actual charge density and desired charge density, by any technique known to those skilled in the art. In embodiments of the invention where block 86 is omitted, block 88 does not use the actual charge density to determine fuel flow.

INDUSTRIAL APPLICABILITY

The fuel system 10 may be used to control the flow of fuel to the engine 12, and thereby regulate various characteristics of the engine 12, such as $NO_x$ or other emissions production. The fuel system 10 may determine the engine speed, the load on the engine, the humidity of the air, and the charge density of the combustion mixture being supplied to the engine 12. The ECM 18 determines a desired fuel flow as a function of these characteristics, and transmits a desired fuel flow signal to the fuel valve 20 or air valve (not shown), and a desired throttle position to the actuator 19. These fuel or air valve and throttle thus control the charge density and volume of the combustion mixture provided to the cylinders 24, and thereby control the $NO_x$ production of the engine 12 to a desired amount.

From the foregoing it will be appreciated that, although specific embodiments of the invention have been described herein for purposes of illustration, various modifications may be made without deviating from the spirit or scope of the invention. Accordingly, the invention is not limited except as by the appended claims.

What is claimed is:

1. An apparatus for determining a value indicative of a desired charge density of a combustion mixture for an engine having an inlet air pathway, comprising:

a first sensor coupled with the engine and operable to determine a first characteristic indicative of an engine speed of the engine, and to transmit an engine speed signal as a function thereof;

a second sensor coupled with the engine and operable to determine a second characteristic indicative of a load on the engine, and to transmit an engine load signal as a function thereof;

a third sensor operable to determine a third characteristic indicative of a humidity of air in the inlet air pathway and to transmit a humidity signal as a function thereof; and a processing device coupled with the first sensor to receive the engine speed signal, with the second sensor to receive the engine load signal, and with the third sensor to receive the humidity signal, the processing device operable to determine a value indicative of a desired charge density for the combustion mixture as a function of the engine speed signal, the engine load signal, and the humidity signal.

2. The apparatus of claim 1 wherein the third sensor comprises a sensor operable to determine an absolute humidity of the air in the inlet air pathway.

3. The apparatus of claim 1 wherein the third sensor comprises a sensor operable to determine a relative humidity of the air in the inlet air pathway.

4. The apparatus of claim 1 wherein the processing device is operable to determine a first desired charge density for the combustion mixture as a function of the engine speed signal and the engine load signal, and is further operable to determine a second desired charge density for the combustion mixture as a function of the first desired charge density and the humidity signal.

5. The apparatus of claim 1 wherein the first sensor comprises an engine speed sensor.

6. The apparatus of claim 1 wherein the second sensor comprises an engine load sensor.

7. The apparatus of claim 1, further comprising a generator coupled with the engine; and wherein the second sensor is coupled with the generator and transmits the engine load signal as a function of a load on the generator.

8. The apparatus of claim 1 wherein the second sensor comprises:

a current sensor; and a voltage sensor.

9. The apparatus of claim 1, further comprising:

a charge density sensing device coupled with the inlet air pathway, the charge density sensing device operable to determine a value indicative of an actual charge density of the combustion mixture and to transmit at least one charge density signal as a function thereof;

wherein the processing device is coupled with the charge density sensing device to receive the at least one charge density signal, and is operable to determine a value indicative of a desired fuel flow for the engine as a function of the at least one charge density signal.

10. The apparatus of claim 9 wherein the value indicative of a desired fuel flow comprises at least one of:

a value indicative of desired fuel flow quantity;

a value indicative of desired fuel flow duration;

a value indicative of desired position of a fuel valve;

a value indicative of desired change in position of the fuel valve;

a value indicative of desired rate of change of the position of the fuel valve;

a value indicative of desired air flow quantity;

a value indicative of desired air flow duration;

a value indicative of desired position of an air valve;

a value indicative of desired change in position of the air valve; and a value indicative of desired rate of change of the position of the air valve.

11. The apparatus of claim 1, further comprising:

a fourth sensor coupled with the inlet air pathway and operable to determine a pressure of a combustion mixture in the inlet air pathway, and to transmit a pressure signal as a function thereof;

a fifth sensor coupled with the inlet air pathway and operable to determine a temperature of the combustion mixture in the inlet air pathway, and to transmit a temperature signal as a function thereof; and wherein the processing device is coupled with the fourth sensor to receive the pressure signal and with the fifth sensor to receive the temperature signal, and is operable to determine a value indicative of a desired fuel flow for the engine as a function of the pressure signal, the temperature signal, and the desired charge density of the combustion mixture.

12. The apparatus of claim 11 wherein the fourth sensor comprises a pressure sensor.

13. The apparatus of claim 11 wherein the fifth sensor comprises a temperature sensor.

14. The apparatus of claim 11 wherein the inlet air pathway comprises an inlet air manifold; and the fourth and fifth sensors are coupled with the inlet air manifold.

15. The apparatus of claim 11 wherein the processing device is operable to determine a value indicative of an actual charge density of the combustion mixture as a function of the pressure signal and the temperature signal.

16. The apparatus of claim 15 wherein the processing device is operable to determine the value indicative of the actual charge density as a function of the pressure signal divided by the temperature signal.

17. The apparatus of claim 1, further comprising:

a sixth sensor coupled with the inlet air pathway and operable to determine a value indicative of a massflow of the combustion mixture in the inlet air pathway, and to transmit a massflow signal as a function thereof;

wherein the processing device is coupled with the sixth sensor to receive the massflow signal, and is operable to determine a value indicative of a desired fuel flow as a function of the massflow signal and the desired charge density signal.

18. The apparatus of claim 17 wherein the sixth sensor comprises a massflow sensor.

19. The apparatus of claim 17 wherein the processing device is operable to determine a value indicative of an actual charge density of the combustion mixture as a function of the massflow signal.

20. An apparatus for determining a value indicative of a fuel flow for an engine having an inlet air pathway, and a generator coupled with the engine to receive power from the engine, comprising:

a speed sensor coupled with the engine and operable to determine a first characteristic indicative of an engine speed of the engine, and to transmit an engine speed signal as a function thereof;

a load sensor coupled with the generator and operable to determine a second characteristic indicative of a load on the engine, and to transmit an engine load signal as a function thereof;

a pressure sensor coupled with the inlet air pathway and operable to determine a value indicative of a pressure of a combustion mixture in the inlet air pathway, and to transmit a pressure signal as a function thereof;

a temperature sensor coupled with the inlet air pathway and operable to determine a value indicative of a temperature of the combustion mixture in the inlet air pathway, and to transmit a temperature signal as a function thereof;

a humidity sensor coupled with the inlet air pathway and operable to determine a value indicative of a humidity of the air in the inlet air pathway, and to transmit a humidity signal as a function thereof; and a processing device coupled with the speed sensor to receive the engine speed signal, with the load sensor to receive the engine load signal, with the pressure sensor to receive the pressure signal, with the temperature sensor to receive the temperature signal, and with the humidity sensor to receive the humidity signal, the processing device operable to:

determine a value indicative of a first desired charge density for the combustion mixture as a function of the engine speed signal and the engine load signal;

determine a value indicative of a second desired charge density of the combustion mixture as a function of the first desired charge density and the humidity signal;

determine a value indicative of an actual charge density for the combustion mixture as a function of the pressure signal divided by the temperature signal; and determine a value indicative of a fuel flow for the engine as a function of the value indicative of the second desired charge density and the value indicative of the actual charge density of the combustion mixture.

21. A method for determining a value indicative of a desired charge density for a combustion mixture for an engine having an inlet air pathway, comprising:

determining a first characteristic indicative of an engine speed of the engine;

determining a second characteristic indicative of a load on the engine;

determining a third characteristic indicative of a humidity of air in the inlet air pathway; and determining a value indicative of a desired charge density for the combustion mixture as a function of the first, second, and third characteristics.

22. The method of claim 21 wherein the first characteristic comprises the engine speed.

23. The method of claim 21 wherein the second characteristic comprises a power output of the engine.

24. The method of claim 21 wherein the third characteristic comprises at least one of an absolute humidity and a relative humidity.

25. The method of claim 21 wherein a power receiving device is coupled with the engine to receive power produced by the engine, and the second characteristic comprises a load on the power receiving device.

26. The method of claim 25 wherein the power receiving device comprises a generator.

27. The method of claim 21, further comprising:

determining a fourth characteristic indicative of a pressure of the combustion mixture;

determining a fifth characteristic indicative of a temperature of the combustion mixture; and determining a value indicative of a desired fuel flow as a function of the desired charge density, the fourth characteristic, and the fifth characteristic.

28. The method of claim 27 wherein the value indicative of a desired fuel flow comprises at least one of:

a value indicative of desired fuel flow quantity;

a value indicative of desired fuel flow duration;

a value indicative of desired position of a fuel valve;

a value indicative of desired change in position of the fuel valve;

a value indicative of desired rate of change of the position of the fuel valve;

a value indicative of desired air flow quantity;

a value indicative of desired air flow duration;

a value indicative of desired position of an air valve;

a value indicative of desired change in position of the air valve; and a value indicative of desired rate of change of the position of the air valve.

29. The method of claim 27, further comprising:

determining a value indicative of an actual charge density of the combustion mixture as a function of the fourth and fifth characteristics; and wherein determining the value indicative of the desired fuel flow comprises determining the value indicative of the desired fuel flow as a function of the desired charge density and the actual charge density of the combustion mixture.

30. The method of claim 29 wherein determining a value indicative of an actual charge density comprises dividing the fourth characteristic by the fifth characteristic.

31. The method of claim 21, further comprising:

determining a sixth characteristic indicative of a massflow of the combustion mixture; and determining a value indicative of the desired fuel flow as a function of the sixth characteristic and the desired charge density.

32. The method of claim 31, further comprising:

determining a value indicative of an actual charge density of the combustion mixture as a function of the massflow of the combustion mixture; and wherein determining the value indicative of the desired fuel flow comprises determining the value indicative of the desired fuel flow as a function of the value indicative of the desired charge density and the value indicative of the actual charge density of the combustion mixture.

33. A method for determining a value indicative of a fuel flow of an engine having an inlet air pathway, comprising:

determining a value indicative of a humidity of air in the inlet air pathway;

determining a value indicative of a desired charge density of a combustion mixture for the engine as a function of the value indicative of the humidity in the inlet air pathway; and determining a value indicative of a desired fuel flow as a function of the value indicative of the desired charge density of the combustion mixture.

34. The method of claim 33, further comprising:

determining a value indicative of an actual charge density of the combustion mixture for the engine; and wherein determining a value indicative of the desired fuel flow comprises determining a value indicative of a desired fuel flow as a function of the difference between the values indicative of the actual and desired charge densities of the combustion mixture.

35. A method for determining a value indicative of a desired fuel flow for an engine coupled with a generator, comprising:

determining a first characteristic indicative of an engine speed of the engine;

determining a second characteristic that is indicative of a load on the generator;

determining a third characteristic indicative of a pressure of the combustion mixture;

determining a fourth characteristic indicative of a temperature of the combustion mixture;

determining a fifth characteristic indicative of a humidity of the air in the inlet air pathway;

determining a value indicative of a desired charge density for the combustion mixture as a function of the first, second, and fifth characteristics;

determining a value indicative of an actual charge density of the combustion mixture as a function of the third characteristic divided by the fourth characteristic of the combustion mixture; and determining a value indicative of a desired fuel flow as a function of the values of the desired charge density and the actual charge density of the combustion mixture.

* * * * *